(12) United States Patent
Okamatsu et al.

(10) Patent No.: US 10,910,607 B2
(45) Date of Patent: Feb. 2, 2021

(54) METHOD FOR PRODUCING SURFACE-TREATED STEEL SHEET FOR BATTERY CONTAINERS AND SURFACE-TREATED STEEL SHEET FOR BATTERY CONTAINERS

(71) Applicant: TOYO KOHAN CO., LTD., Tokyo (JP)

(72) Inventors: Eiji Okamatsu, Tokyo (JP); Yuji Nakano, Tokyo (JP); Daisuke Matsushige, Tokyo (JP)

(73) Assignee: Toyo Kohan Co., Ltd., Tokyo (JP)

( * ) Notice: Subject to any disclaimer, the term of this patent is extended or adjusted under 35 U.S.C. 154(b) by 591 days.

(21) Appl. No.: 15/557,937

(22) PCT Filed: Mar. 11, 2016

(86) PCT No.: PCT/JP2016/057846
§ 371 (c)(1),
(2) Date: Sep. 13, 2017

(87) PCT Pub. No.: WO2016/148084
PCT Pub. Date: Sep. 22, 2016

(65) Prior Publication Data
US 2018/0062121 A1 Mar. 1, 2018

(30) Foreign Application Priority Data
Mar. 13, 2015 (JP) .................. 2015-050543

(51) Int. Cl.
*B32B 15/00* (2006.01)
*H01M 2/02* (2006.01)
*C25D 7/06* (2006.01)
*C25D 7/00* (2006.01)
*B21D 22/20* (2006.01)
(Continued)

(52) U.S. Cl.
CPC ........ *H01M 2/0292* (2013.01); *B21D 22/201* (2013.01); *C25D 3/12* (2013.01);
(Continued)

(58) Field of Classification Search
None
See application file for complete search history.

(56) References Cited

U.S. PATENT DOCUMENTS 3,880,727 A 4/1975 Jürging
2012/0171518 A1* 7/2012 Takematsu ............... C25D 7/00
428/679
(Continued)

FOREIGN PATENT DOCUMENTS

CN 1449588 A 10/2003
CN 1647293 A 7/2005
(Continued)

OTHER PUBLICATIONS

An Office Action in the European Patent Office corresponding to Application No. 16 764 914.4 dated Jun. 7, 2019 is attached, 9 pages.
(Continued)

*Primary Examiner* — Seth Dumbris
(74) *Attorney, Agent, or Firm* — Muncy, Geissler, Olds & Lowe, P.C.

(57) ABSTRACT

There is provided a method for producing a surface-treated steel sheet for battery containers (1) comprising forming a dull or semi-bright nickel plating layer (12) on at least the surface to be the outside of a battery container in a steel sheet (11), wherein the nickel plating layer (12) is formed by performing plating treatment under a condition of a bath temperature of 70° C. or more.

2 Claims, 8 Drawing Sheets

(51) Int. Cl.
    *C25D 3/12* (2006.01)
    *C25D 3/56* (2006.01)
    *C25D 5/14* (2006.01)
    *C25D 5/50* (2006.01)
    *B21D 53/00* (2006.01)

(52) U.S. Cl.
    CPC ............... *C25D 3/562* (2013.01); *C25D 5/14* (2013.01); *C25D 5/50* (2013.01); *C25D 7/00* (2013.01); *C25D 7/0614* (2013.01); *H01M 2/02* (2013.01); *B21D 53/00* (2013.01); *H01M 2002/0297* (2013.01); *Y10T 428/12937* (2015.01)

(56) References Cited

U.S. PATENT DOCUMENTS

| | | | |
|---|---|---|---|
| 2013/0086971 A1* | 4/2013 | Tomomori | B32B 1/08 72/379.2 |
| 2014/0050971 A1* | 2/2014 | Tomomori | H01M 2/026 429/176 |
| 2015/0162576 A1* | 6/2015 | Horie | C23F 17/00 429/163 |

FOREIGN PATENT DOCUMENTS

| | | |
|---|---|---|
| CN | 102763237 A | 10/2012 |
| CN | 103597626 A | 2/2014 |
| EP | 1 498 963 A1 | 1/2005 |
| JP | 2000-082446 A | 3/2000 |
| JP | 2000-123797 A | 4/2000 |
| JP | 2004-218043 A | 8/2004 |
| JP | 2009-104979 A | 5/2009 |
| JP | 2014-047359 A | 3/2014 |
| WO | WO 2012/147843 A1 | 7/2014 |

OTHER PUBLICATIONS

European Office Action which corresponds to Application No. 16764914.4-1103; dated Feb. 12, 2020.

Office Action dated Jun. 15, 2020 in Japanese Application No. 2017-506535 (w/English translation).

Office Action dated Nov. 12, 2019 in JP Application No. 20170506535 w/English translation.

* cited by examiner

Fig. 4

METHOD FOR PRODUCING SURFACE-TREATED STEEL SHEET FOR BATTERY CONTAINERS AND SURFACE-TREATED STEEL SHEET FOR BATTERY CONTAINERS

TECHNICAL FIELD

The present invention relates to a method for producing a surface-treated steel sheet for battery containers and to a surface-treated steel sheet for battery containers.

BACKGROUND ART

In recent years, alkaline batteries which are primary batteries and nickel hydrogen batteries and lithium-ion batteries which are secondary batteries are widely used as an operating power source for use in portable devices such as audio devices and mobile phones, which are used in various fields. These batteries are required to have a long service life, enhanced performance, or the like in accordance with the enhanced performance of the devices in which the batteries are equipped. A battery container, which is filled with electric power generating elements such as positive electrode active materials and negative electrode active materials, is also required to be improved in their performance as an important constitutional element of batteries.

As such a battery container, for example, a battery container obtained by press-working a surface-treated steel sheet obtained by forming a nickel plating layer and an iron-nickel alloy plating layer on a steel sheet is disclosed in Patent Document 1.

PRIOR ART DOCUMENT

Patent Document

[Patent Document 1] JP 2000-123797 A

SUMMARY OF INVENTION

Problems to be Solved by Invention

Unfortunately, in the battery container disclosed in Patent Document 1 described above, when the surface to be the outside of the battery container (the surface to be in contact with a press mold during press-working) in the surface-treated steel sheet is dull or semi-bright, the surface has insufficient slidability. Thus, heat is excessively generated due to friction during press-working of the surface-treated steel sheet. Accordingly, the surface-treated steel sheet locally heated during formation is seized to the press mold to thereby prevent easy removal of the formed battery container from the press mold, or flaws are caused on the outside of the battery container. In addition, heat expansion of the press mold reduces the dimensional precision of the side wall thickness of the battery container. These phenomena are problematic.

An object of the present invention is to provide a method for producing a surface-treated steel sheet for battery containers, wherein the surface-treated steel sheet has excellent press workability even when a dull or semi-bright nickel plating layer is formed on the surface thereof to be in contact with a press mold.

Means for Solving Problems

According to an aspect of the present invention, there is provided a method for producing a surface-treated steel sheet for battery containers comprising forming a dull or semi-bright nickel plating layer on at least the surface to be the outside of a battery container in a steel sheet, wherein the nickel plating layer is formed by performing plating treatment under a condition of a bath temperature of 70° C. or more.

In the producing method of the present invention, it is preferred that a plating bath containing no organosulfur compound be used for the plating treatment.

In the producing method of the present invention, it is preferred that no thermal diffusion treatment of the nickel plating layer be performed after the plating treatment.

In the producing method of the present invention, it is preferred to form the nickel plating layer having a micro-Vickers hardness (HV) under a load of 10 g of 280 or more by the plating treatment.

In the producing method of the present invention, it is preferred to form the nickel plating layer having a kinetic friction coefficient of 0.40 or less measured under a vertical load of 1 N/mm$^2$ by the plating treatment.

In the producing method of the present invention, it is preferred to form the nickel plating layer having a thickness of 2.0 μm or more by the plating treatment.

In the producing method of the present invention, it is preferred to form the nickel plating layer on both the surface to be the outside and the surface to be the inside of the battery container by the plating treatment.

In the producing method of the present invention, it is preferred to further form a nickel-cobalt alloy plating layer on the nickel plating layer formed on the surface to be the inside of the battery container.

In the producing method of the present invention, it is preferred to form the nickel-cobalt alloy plating layer having a thickness of 0.03 μm or less.

According to another aspect of the present invention, there is provided a method for producing a battery container produced by forming-working the surface-treated steel sheet for battery containers obtained by the producing method mentioned above.

According to still another aspect of the present invention, there is provided a method for producing a battery including the battery container obtained by the producing method mentioned above.

According to a further aspect of the present invention, there is provided a surface-treated steel sheet for battery containers including a dull or semi-bright nickel plating layer on at least the surface to be the outside of a battery container in a steel sheet, wherein the nickel plating layer has a thickness of 0.5 to 3.5 μm and a surface kinetic friction coefficient of 0.4 or less as measured under a load of 100 gf.

According to a still further aspect of the present invention, there is provided a surface-treated steel sheet for battery containers including an underlying layer composed of an iron-nickel diffusion layer and a dull or semi-bright nickel plating layer formed in this order on at least the surface to be the outside of a battery container in a steel sheet, wherein the nickel plating layer has a thickness of 0.5 to 3.5 μm and has a surface kinetic friction coefficient of 0.4 or less as measured under a load of 100 gf.

Effect of Invention

According to the present invention, a nickel plating layer is formed by performing plating treatment under a condition of a bath temperature of 70° C. or more. Thus, the hardness of the nickel plating layer is increased to thereby reduce the kinetic friction coefficient of the surface of the nickel plating layer. As a result, friction heat generated at the time of contact with a press mold is reduced to thereby enable a surface-treated steel sheet for battery containers having excellent press workability to be provided.

BRIEF DESCRIPTION OF DRAWINGS

FIG. 4 is a graph showing measurement results of the surface hardness of the surface-treated steel sheets for battery containers of Examples 1 and 2 and Comparative Examples 1 to 6.

MODE(S) FOR CARRYING OUT THE INVENTION

Embodiments of the present invention will hereinafter be described with reference to the drawings. The surface-treated steel sheet for battery containers according to the present invention is worked into an outer shape depending on the desired battery shape. Examples of the battery include, but not particularly limited to, primary batteries such as alkaline batteries and secondary batteries such as nickel hydrogen batteries and lithium-ion batteries. The surface-treated steel sheet for battery containers according to the present invention can be used as members of battery containers for these batteries. Hereinbelow, the present invention will be described in accordance with an embodiment in which the surface-treated steel sheet for battery containers according to the present invention is employed in a positive electrode can constituting the battery container of an alkaline battery.

Figure 1:
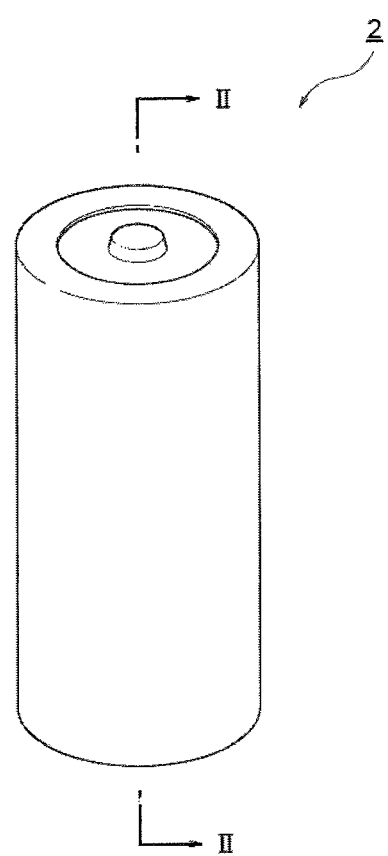
FIG. 1 is a perspective view illustrating one embodiment of a battery formed by applying a surface-treated steel sheet for battery containers according to the present invention.
Figure 2:
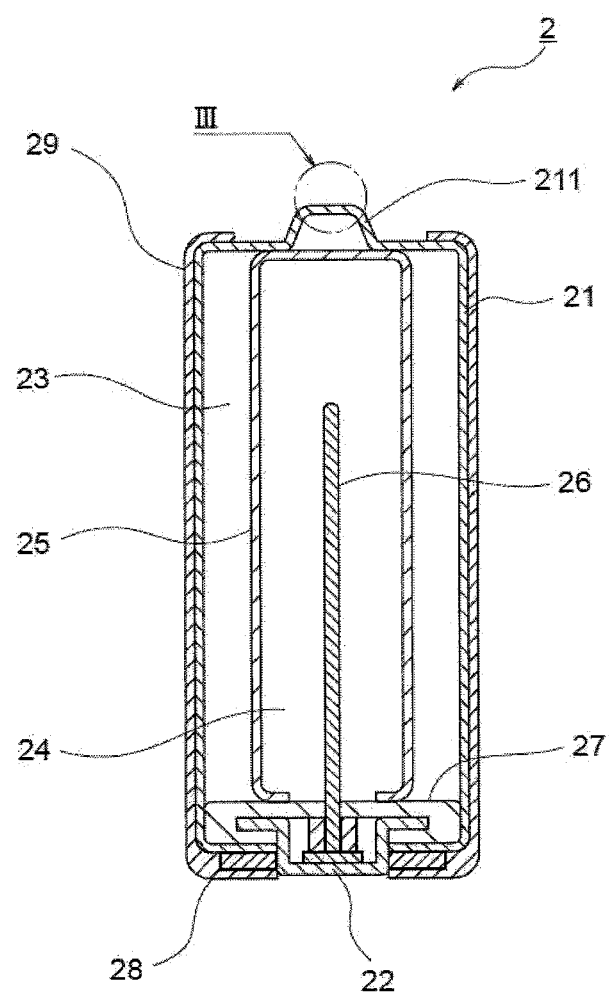
FIG. 2 is a cross-sectional view taken along line II-II in FIG. 1.

FIG. 1 is a perspective view illustrating one embodiment of an alkaline battery 2 formed by applying a surface-treated steel sheet for battery containers according to the present invention, and FIG. 2 is a cross-sectional view taken along line II-II in FIG. 1. The alkaline battery 2 of the present embodiment includes a positive electrode mixture 23 and a negative electrode mixture 24 via a separator 25 filled in a bottomed cylindrical positive electrode can 21. A sealing member, which is constituted by a negative electrode terminal 22, a current collector 26, and a gasket 27, is crimped onto the inner side of the positive electrode can 21. A protruding positive electrode terminal 211 is formed at the center of the bottom of the positive electrode can 21. The positive electrode can 21 is fitted with an outer package 29 via an insulating ring 28 in order to impart an insulating property, improve the designability and the like.

The positive electrode can 21 of the alkaline battery 2 shown in FIG. 1 is obtained by forming-working the surface-treated steel sheet for battery containers according to the present invention by a deep drawing process, a drawing/ironing process (DI process), a drawing/stretching process (DTR process), a process in which both stretching and ironing processes are performed after drawing process or the like. Hereinafter, the configuration of the surface-treated steel sheet for battery containers according to the present invention (surface-treated steel sheet 1) will be described with reference to FIG. 3.

Figure 3:
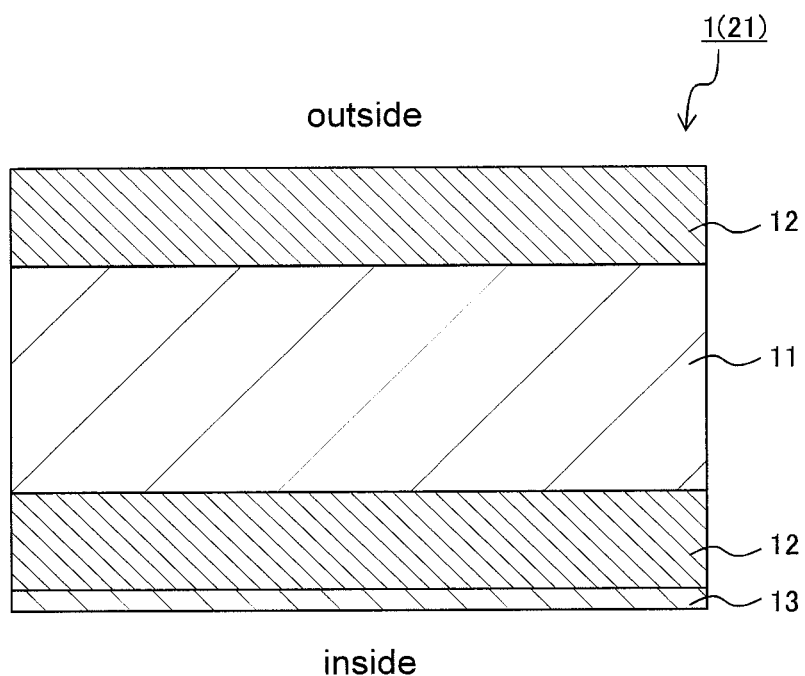
FIG. 3 is an enlarged sectional view of the portion III in FIG. 2 of one embodiment of a surface-treated steel sheet for battery containers according to the present invention.

FIG. 3 is an enlarged sectional view of the portion III in FIG. 2. In FIG. 3, the lower side corresponds to the inside of the alkaline battery 2 in FIG. 1 (the surface to be in contact with the positive electrode mixture 23 of the alkaline battery 2), and the upper side corresponds to the outside of the alkaline battery 2. In the surface-treated steel sheet 1 of the present embodiment shown in FIG. 3, a dull or semi-bright nickel plating layer 12 is formed on each of both the main surfaces of a steel sheet 11 constituting the base material of the surface-treated steel sheet 1, and a nickel-cobalt alloy plating layer 13 is further formed on the nickel plating layer 12 of the surface to be the inside of the alkaline battery 2. Either one of the nickel plating layer 12 or the nickel-cobalt alloy plating layer 13 in the inside of the alkaline battery 2 may be omitted from the configuration.

<Steel Sheet 11>

The steel sheet 11 of the present embodiment is not particularly limited so long as the steel sheet has excellent forming workability. For example, low-carbon aluminum killed steel (carbon content 0.01 to 0.15% by weight), ultra-low carbon steel having a carbon content of 0.003% by weight, or non-aging ultra-low carbon steel obtained by adding Ti, Nb or the like to ultra-low carbon steel can be used.

In the present embodiment, hot-rolled sheets of these steels, after subjected to pickling to remove scale on the surface (oxide film), are cold-rolled, electrolytically cleaned, annealed, and temper-rolled to thereby provide substrates to be used. Annealing in this case may be either of continuous annealing or box annealing and is not particularly limited.

<Nickel Plating Layer 12>

The nickel plating layer 12 is a dull or semi-bright plating layer, which is formed by nickel-plating the steel sheet 11 mentioned above, on at least the surface to be the outside of or both the main surfaces of the steel sheet 11.

Examples of the nickel-plating bath that can be used for forming the nickel plating layer 12 include, but not particularly limited to, plating baths usually used for nickel plating, that is, Watts baths, sulfamate baths, boric fluoride baths, and chloride baths. The nickel plating layer 12 can be formed by electroplating using, for example, a bath having a composition of 200 to 350 g/L nickel sulfate, 20 to 60 g/L nickel chloride, and 10 to 50 g/L boric acid as a Watt bath.

In the present embodiment, the nickel plating layer 12 may be dull or may be semi-bright as mentioned above. As a method for forming the semi-bright nickel plating layer 12, a method is exemplified including adding a semi-brightener to the nickel-plating bath and forming a nickel plating layer using the nickel-plating bath to which this semi-brightener is added. The gloss level becomes higher in the case where a semi-brightener is used to form the semi-bright nickel plating layer 12 in this manner, than in the case where the dull nickel plating layer 12 is formed without using a semi-brightener. For example, the semi-bright nickel plating layer 12 (plating conditions: current density: 20 A/dm$^2$ and bath temperature: 70° C.) and a dull nickel plating layer 12 (plating conditions: current density: 20 A/dm$^2$ and bath temperature: 60° C.) are each formed on steel sheets having comparable surface roughness so as to achieve the same plating thickness, using the same nickel-plating baths except that the bath for the semi-bright nickel plating layer contains a semi-brightener. These layers are measured for 60-degree specular glossiness as a gloss level using a gloss meter (VG-2000 manufactured by NIPPON DENSHOKU INDUSTRIES CO., LTD.). A sample including the semi-bright nickel plating layer 12 formed has a gloss level of 223.2 and the sample including the dull nickel plating layer 12 formed has a gloss level of 96.0. Both samples are obviously different. The gloss level depends on the film thickness and surface roughness. The semi-bright nickel plating layer in the present embodiment usually has a gloss level, which is measured with a gloss meter, of 150 or more, when its surface roughness Ra is set to 0.1 to 0.8 μm.

It is only required that the semi-brightener contain no sulfur. Examples of the semi-brightener include, but not particularly limited to, aliphatic unsaturated alcohols such as polyoxyethylene adducts of unsaturated alcohols, unsaturated carboxylic acids, formaldehyde, and coumarin.

In the present embodiment, as a method for forming the dull nickel plating layer 12, a method is exemplified including forming a nickel plating layer using a nickel-plating bath containing substantially no brightener or semi-brightener.

Also in the present invention, it is preferred that an additive containing sulfur be not substantially used in the nickel-plating bath. In the present invention, in the case where the nickel plating layer 12 formed using such a nickel-plating bath is measured with a glow discharge optical emission spectrometer, the sulfur intensity is preferably at the noise level (or an intensity equivalent to that of impurities) or less. In such a case, the nickel plating layer 12 can be considered to contain substantially no sulfur. For example, in a HORIBA GD-OES, the pressure is set to 600 Pa, the power is set to 35 W, and the photo multiplier voltage (HV) is set as described below for each element. The ratio of the S intensity to the Ni intensity (S intensity/Ni intensity) obtained in the nickel plating layer 12 is, for example, of the order of 0.00057, which is less than 0.001 when a dull agent or semi-brightener is used. In contrast, when a brightener containing sulfur is used, the ratio is, for example, of the order of 0.00723, which is well over 0.001. Accordingly, in the case where the nickel plating layer 12 is dull and semi-bright, the above ratio (S intensity/Ni intensity) is less than 0.001, and it can be considered that the nickel plating layer 12 contains substantially no sulfur. In the case where the nickel plating layer 12 is bright, the above ratio (S intensity/Ni intensity) is 0.001 or more, and it can be determined that the layer contains sulfur. The measurement was carried out at the following HV's: nickel: 700, iron: 850, carbon: 900, oxygen: 700, and sulfur: 999.

In the present embodiment, to a plating bath used for nickel plating, a brightener (an agent obtained by pulverizing crystals constituting the nickel plating layer 12 and, as a result, serves to increase the surface hardness), particularly an additive constituted by an organosulfur compound (for example, a brightener such as saccharin and sodium naphthalenesulfonate) is not preferably added.

Particularly in the present embodiment, not adding an additive constituted by an organosulfur compound to the plating bath can prevent a failure caused by the presence of an excessive amount of sulfur in the nickel plating layer 12, in other words, a failure of reduction in the battery performance of the alkaline battery 2 to be obtained caused by an increase in the contact resistance value of the nickel plating layer 12 constituting the battery container during long-term storage of the alkaline battery 2.

In the present embodiment, an additive that has a weak effect of increasing the surface hardness of the nickel plating layer 12 (e.g., a pit inhibitor) may be added to the plating bath described above as appropriate.

The bath temperature during formation of the nickel plating layer 12 using the aforementioned plating bath is only required to be 70° C. or more, and is preferably 70 to 80° C., more preferably 70° C. to 75° C. Setting the bath temperature of the plating bath to the range described above reduces the crystalline diameter of the nickel plating layer 12 to be obtained. This reduction increases the surface hardness, resulting in an improvement in the press workability of the surface-treated steel sheet 1.

In other words, conventionally, when the surface to be the outside of the alkaline battery 2 in the surface-treated steel sheet 1 (the surface to be in contact with a press mold during press-working) is dull or semi-bright and has insufficient slidability, heat is excessively generated due to friction with the press mold during press-working of the surface-treated steel sheet 1. This causes a defect in which the press mold thermally expands to prevent removal of the surface-treated steel sheet 1 after formation from the press mold and the steel sheet 1 lies on a surface-treated steel sheet 1 to be pressed subsequently (doubling), or a problem of seizure or flaws occurring on the press mold.

In order to prevent such doubling of surface-treated steel sheets 1 and seizure or flaws onto the press mold, there is a method including adding an additive for increasing the hardness of the nickel plating layer 12 to the plating bath for forming the nickel plating layer 12 and forming the nickel plating layer 12 on each of both the main surfaces of the steel sheet 11 using this plating bath. Unfortunately, with this method, the contact resistance value of the nickel plating layer 12 to be formed tends to be increased after long-term storage due to the influence of sulfur and the like contained in the additive, and the alkaline battery 2 produced from this plating layer 12 will have reduced battery performance.

Alternatively, in order to prevent doubling of the surface-treated steel sheets 1 and seizure or flaws to the press mold, there is a method including forming the nickel plating layer 12 using a plating bath containing an additive for increasing the hardness of the nickel plating layer 12 only on the surface to be the outside of the alkaline battery 2 in the steel sheet 11 (the surface to be in contact with the press mold during press working). Unfortunately, with this method, it is necessary to use a separate plating bath for each of the outside and the inside of the steel sheet 11, and thus, it is mandatory to additionally provide a bath for controlling the plating baths and to form a nickel plating layer 12 on each of the outside and the inside of the steel sheet 11. This reduces the production efficiency of the surface-treated steel sheet 1 and results in a disadvantage in cost.

Moreover, in the case of using a plating bath containing an additive for increasing the hardness of the nickel plating layer 12, it is not possible to use a production line for other nickel plating products from which high hardness is not required (i.e., nickel plating products manufactured without using the additive described above). Thus, it is necessary to install a production line different from such a production line or to flush the bath tank of the production line and replace the plating bath. Also with respect to this point, the method leads to significant reduction in the production efficiency of the surface-treated steel sheet 1 and is disadvantageous in cost.

In contrast, in the present embodiment, when the nickel plating layer 12 is formed on the surface to be the outside of the alkaline battery 2, setting the bath temperature of the plating bath to be within the range described above increases the surface hardness of the nickel plating layer 12 as mentioned above to thereby reduce the kinetic friction coefficient between the nickel plating layer 12 and the press mold. As a result, the friction heat during press-working of the surface-treated steel sheet 1 is reduced, doubling of surface-treated steel sheets 1 and seizure or flaws onto the press mold are effectively prevented, and the press workability of the surface-treated steel sheet 1 is improved.

Additionally, according to the present embodiment, a nickel plating layer 12 can be formed on each of both the surface to be the outside of the alkaline battery 2 and the surface to be the inside of the alkaline battery 2 in the steel sheet 11 using a plating bath of the same composition in one step (one pass). This step increases the production efficiency of the surface-treated steel sheet 1 and is advantageous in cost. During this step, the thickness of the nickel plating layers 12 on each of the surface to be the outside and the surface to be the inside may be the same, or may be different by changing the current density. It is at least required that the surface to be the outside be the nickel plating layer 12 of the present embodiment. It is not necessary to add an additive constituted by an organosulfur compound (such as brightener) to the plating bath used for forming the nickel plating layer 12. Thus, it is possible to prevent an increase in the contact resistance value of the surface-treated steel sheet 1 due to incorporation of sulfur in the nickel plating layer 12. Furthermore, since it is not necessary to add an additive such as a brightener containing sulfur to the plating bath, it is possible to share bath tank with the plating bath of other nickel plating products (nickel plating products from which gloss surface is not required), leading to an improvement in the production efficiency of the surface-treated steel sheet 1 and other nickel plating products.

In the present invention, the pH of the plating bath during formation of the nickel plating layer 12 is preferably 2.0 to 5.3, more preferably 3.3 to 5.0, still more preferably 3.8 to 4.9. Setting the pH of the plating bath to be within the range described above further increases the hardness of the nickel plating layer 12 to be formed.

The hardness, which is a Vickers hardness (HV) measured under a load of 10 gf, of the nickel plating layer 12 on the surface to be the outside of the alkaline battery 2 in the surface-treated steel sheet 1 is preferably 240 or more, more preferably 280 or more.

The kinetic friction coefficient, which is measured under a vertical load of 1 N/mm$^2$, of the nickel plating layer 12 on the surface to be the outside of the alkaline battery 2 in the surface-treated steel sheet 1 is preferably 0.40 or less, more preferably 0.20 or less.

In the present embodiment, as a condition other than the bath temperature during formation of the nickel plating layer 12, the pH of the plating bath is preferably 2.0 to 5.3, more preferably 3.3 to 5.0, still more preferably 3.8 to 4.9. The current density during formation of the nickel plating layer 12 by electroplating is 12 A/dm$^2$ or more, preferably 12 to 40 A/dm$^2$, more preferably 12 to 20 A/dm$^2$, particularly preferably 15 to 20 A/dm$^2$. When the nickel plating layer 12 is formed, setting the pH and the current density of the plating bath to be within the range described above can increase the hardness of the nickel plating layer 12. Furthermore, setting the current density in the case of forming the nickel plating layer 12 to a relatively high value, as the range described above, enables formation of the nickel plating layer 12 in a shorter time, leading to an improvement in the production efficiency of the surface-treated steel sheet 1.

Particularly, the present inventors have found that an increase in the current density in the case of performing electroplating is likely to lead to a decrease in the hardness of the nickel plating layer 12. Meanwhile, the present inventors also found that controlling the bath temperature to be within the aforementioned range during formation of the nickel plating layer 12 enables the hardness of the nickel plating layer 12 obtained to be increased, even if the current density is set to a relatively high value, as the range described above. Based on such findings, the present inventors have found that the hardness of the nickel plating layer 12 constituting the surface-treated steel sheet 1 is increased while the production efficiency of the surface-treated steel sheet 1 is improved by balancing the bath temperature condition and the current density condition in the range described above in the case of performing electroplating. This can reduce the kinetic friction coefficient between the surface-treated steel sheet 1 and the press mold and suppress heat generation during press-working of the surface-treated steel sheet 1 to thereby effectively prevent doubling of the surface-treated steel sheets 1 and seizure or flaws onto the press mold.

The nickel plating layer 12 of the present embodiment is dull or semi-bright nickel-plating as mentioned above. In the present embodiment, the arithmetic mean roughness (Ra) of the surfaces of the nickel plating layer 12 is preferably 0.20 μm or more, more preferably 0.30 μm or more. In the present embodiment, even if a nickel plating layer 12 having relatively high arithmetic mean roughness (Ra) of the surface as in the range described above is formed, adjustment of the bath temperature and the current density of the plating bath during formation of the nickel plating layer 12 increases the hardness of the nickel plating layer 12. This reduces the kinetic friction coefficient between the surface-treated steel sheet 1 and the press mold to suppress heat generation during press-working of the surface-treated steel sheet 1. Thus, doubling of the surface-treated steel sheets 1 and seizure or flaws onto the press mold can be effectively prevented.

In the nickel plating layer 12 of the present embodiment, with respect to the crystal orientation of the surface of the nickel plating layer 12, the existence ratio of the (200) plane to the (111) plane, the (200) plane, the (220) plane, and the (311) plane is preferably more than 40%, more preferably 50% or more, still more preferably 70% or more.

The existence ratio of the (200) plane mentioned above can be measured by analyzing the surface of the nickel plating layer 12 by X-ray diffraction. Specifically, there can be exemplified a method including measuring using an X-ray diffraction apparatus (RINT 2500/PC, manufactured by Rigaku Corporation) under conditions of X-ray: Cu-40 kV-200 mA, divergent slit: 2 deg, scattering slit: 1 deg, light receiving slit: 0.3 mm, and measurement range: 40°≤2θ≤90°. In this X-ray diffraction analysis, peaks based on individual crystal planes appear at 2θ=44.5° on the (111) plane, at 2θ=51.8° on the (200) plane, at 2θ=76.3° on the (220) plane, and at 2θ=92.9° on the (311) plane. The integral intensity based on each crystal plane is determined, and the intensities are corrected by publicly-known correction values ((111) plane: 1, (200) plane: 0.42, (220) plane: 0.21, and (311) plane: 0.2). Then, (integral intensity of (200) plane/ total integral intensity of (111) plane, (200) plane, (220)

plane, and (311) plane) can be calculated to thereby determine the existence ratio of the (200) plane on the surface of the nickel plating layer 12.

The present inventors have found that, in the case where the existence ratio of the (200) plane is high with respect to the nickel plating layer 12, the surface hardness of the nickel plating layer 12 becomes higher to thereby further reduce the kinetic friction coefficient between the surface-treated steel sheet 1 to be obtained and the press mold. Thus, based on such findings, the present inventors have focused on increasing the surface hardness to thereby improve the press workability rather than the properties such as corrosion resistance with respect to the nickel plating layer 12 to be formed on the surface to be the outside of the battery container. Then the present inventors have found that setting the existence ratio of the (200) plane of the surface of the nickel plating layer 12 to be within the range described above is preferable as an exemplary process of increasing the surface hardness of the nickel plating layer 12.

An example of the process of setting the existence ratio of the (200) plane in the nickel plating layer 12 to be within the range described above includes, but not particularly limited to, a process of setting each of the bath temperature and the current density of the plating bath in the case of forming the nickel plating layer 12 to be within the range described above by electroplating.

In the present embodiment, the nickel plating layer 12 is formed on the steel sheet 11 in the manner described above. The nickel plating layer 12 may be formed directly on the steel sheet 11. Alternatively, an underlying layer is formed on the steel sheet 11 in advance, and the nickel plating layer 12 may be formed on this underlying layer.

Examples of the underlying layer include, but not particularly limited to, iron-nickel diffusion layers. An iron-nickel diffusion layer can be formed by thermally-treating the steel sheet 11 on which a nickel plating layer is formed in advance. In other words, before the aforementioned nickel plating layer 12 is formed on the steel sheet 11, a nickel plating layer for an underlying layer is formed on the steel sheet 11. Thermally-treating the steel sheet 11 on which the nickel plating layer for an underlying layer is formed thermally-diffuses the nickel plating layer for the underlying layer to thereby enable formation of an iron-nickel diffusion layer. At this time, the iron-nickel diffusion layer may be an iron-nickel diffusion layer in which iron has diffused to the surface layer of the nickel-plating layer for the underlying layer. Alternatively, iron may not diffuse to the surface layer and a portion of the nickel plating layer for an underlying layer may remain in a softened state by thermal treatment. In the present embodiment, formation of such an iron-nickel diffusion layer as an underlying layer allows the nickel plating layer 12 to be formed via the iron-nickel diffusion layer on the steel sheet 11 to thereby improve the adhesion of the nickel plating layer 12 to the steel sheet 11. Formation of an iron-nickel diffusion layer as the base of the nickel plating layer 12 enables the hardness of the nickel plating layer 12 to be increased even when the nickel plating layer 12 is thin.

In the present embodiment, in the case where the nickel plating layer 12 is formed directly on the steel sheet 11, the thickness of the nickel plating layer 12 is preferably 0.5 µm or more, more preferably 1.5 µm or more, still more preferably 2.0 µm or more. In this case, the upper limit of the thickness of the nickel plating layer 12 is not particularly limited, and, from the viewpoint of being advantageous in cost, is preferably 3.5 µm or less, more preferably 3.0 µm or less. Setting the thickness of the nickel plating layer 12 directly formed on the steel sheet 11 to be within the range described above can increase the hardness of the nickel plating layer 12.

In the present embodiment, in the case where the nickel plating layer 12 is formed via the aforementioned underlying layer on the steel sheet 11, the thickness of the nickel plating layer 12 is preferably 0.5 µm or more, more preferably 1.0 µm or more. In this case, the upper limit of the thickness of the nickel plating layer 12 is not particularly limited, and, from the viewpoint of being advantageous in cost, is preferably 3.5 µm or less, more preferably 3.0 µm or less, still more preferably 2.5 µm or less. Setting the thickness of the nickel plating layer 12 to be formed via the underlying layer on the steel sheet 11 to be within the range described above can increase the hardness of the nickel plating layer 12.

<Nickel-Cobalt Alloy Plating Layer 13>

The nickel-cobalt alloy plating layer 13 is a plating layer to be formed on the surface to be the inside of the alkaline battery 2 of the nickel plating layer 12 by electroplating using a nickel-cobalt alloy plating bath. In the present embodiment, formation of the nickel-cobalt alloy plating layer 13 on the surface to be the inside of the alkaline battery 2 improves the electrical conductivity of the surface-treated steel sheet 1 to be obtained, and the battery performance of the alkaline battery 2 obtained by working this steel sheet will be improved.

The nickel-cobalt alloy plating bath for forming the nickel-cobalt alloy plating layer 13 is not particularly limited. A Watt bath-based plating bath containing nickel sulfate, nickel chloride, cobalt sulfate, and boric acid can be used, for example. The cobalt/nickel ratio in the plating bath is preferably 0.10 to 0.29, more preferably 0.10 to 0.24, as a molar ratio of cobalt/nickel.

The conditions when the nickel-cobalt alloy plating layer 13 is formed preferably include a bath temperature of 40 to 80° C., a pH of 2.0 to 5.0, and a current density of 1 to 40 A/dm$^2$. When plating for forming the nickel-cobalt alloy plating layer 13 is performed, it is preferred that the steel sheet 11 be covered with an edge mask so as not to form a nickel-cobalt alloy plating layer 13 on the nickel plating layer 12 which is the surface to be the outside of the alkaline battery 2.

The thickness of nickel-cobalt alloy plating layer 13 to be formed on the inside is preferably 0.1 to 0.4 µm, more preferably 0.15 to 0.2 µm. If the alloy plating layer is formed on the outside, a thickness of preferably 0.03 µm or less does not inhibit the effect of the present invention. The thickness is more preferably 0.01 µm or less, and it is most preferred that no alloy plating layer be formed on the outside.

The surface-treated steel sheet 1 of the present embodiment is configured in the manner described above.

The surface-treated steel sheet 1 of the present embodiment is forming-worked by a deep drawing process, a drawing/ironing process (DI process), a drawing/stretching process (DTR process), a process in which both stretching and ironing processes are performed after drawing process or the like into a positive electrode can 21 of the alkaline battery 2 shown in FIGS. 1 and 2, battery containers of other batteries and the like to be used.

When the surface-treated steel sheet 1 of the present embodiment, which has excellent press workability as mentioned above, is forming-worked into a battery container, low-viscosity press oil having an excellent degreasing property can be used, and thus, the press oil can be easily degreased after forming-working. In other words, with a highly viscous press oil, flaws and the like on the press mold tend to be easily prevented while degreasing of the press oil after press-working becomes difficult. In the surface-treated steel sheet 1 of the present embodiment, even in the case where a low viscous press oil is used, flaws and the like on the press mold can be prevented, and thus, degreasing and washing of the press oil after press-working becomes easy.

<Method for Producing Surface-Treated Steel Sheet 1>

Subsequently, the surface-treated steel sheet 1 of the present embodiment will be described.

First, a steel sheet for constituting the steel sheet 11 is provided. The steel sheet 11 is nickel-plated as mentioned above to form a nickel plating layer 12 on both the main surfaces of the steel sheet 11. Although a nickel plating layer 12 of different composition and surface roughness may be formed on each of both the surface to be the outside of the alkaline battery 2 and the surface to be the inside of the alkaline battery 2 in steel sheet 11 using plating baths of different composition, it is preferred that the nickel plating layer 12 be formed on each of both the surfaces of the steel sheet 11 using the same plating bath in one step (one pass) from the viewpoint of improving the production efficiency. The bath temperature in the case of performing plating should be set to 70° C. or more.

In the present embodiment, after the nickel plating layer 12 is formed, thermal diffusion of the steel sheet 11 and the nickel plating layer 12 is preferably prevented. In other words, iron constituting steel sheet 11 has a hardness lower than that of nickel, and thus, thermal diffusion of the iron of the steel sheet 11 to the nickel plating layer 12 may reduce the hardness of the nickel plating layer 12, leading to reduction in the press workability of the surface-treated steel sheet 1 to be obtained. In the present embodiment, accordingly, when the steel sheet 11 and the nickel plating layer 12 are subjected to no thermal diffusion treatment, the hardness of the nickel plating layer 12 can be increased and the press workability of the surface-treated steel sheet 1 can be improved.

Subsequently, in the present embodiment, formation of a nickel-cobalt alloy plating layer 13 on the nickel plating layer 12 of the surface to be the inside of alkaline battery 2 by electroplating using a nickel-cobalt alloy plating bath can provide a surface-treated steel sheet 1 shown in FIG. 3.

In the manner described above, the surface-treated steel sheet 1 of the present embodiment is produced.

According to the present embodiment, when the nickel plating layer 12 is formed on the surface to be the outside of the alkaline battery 2 as mentioned above, setting the bath temperature of the plating bath to 70° C. or more increases the surface hardness of the nickel plating layer 12 to thereby reduce the kinetic friction coefficient between the nickel plating layer 12 and the press mold. As a result, friction heat generated during press-working the surface-treated steel sheet 1 is reduced, doubling of the surface-treated steel sheets 1 and seizure or flaws onto the press mold become effectively prevented, and the press workability of the surface-treated steel sheet 1 is improved. Accordingly, the surface-treated steel sheet 1 of the present embodiment can be suitably used as battery containers to be formed by press-working, for example, as battery containers for an alkaline battery, a battery including an alkaline liquid electrolyte such as a nickel-hydrogen battery, or a lithium ion battery.

According to the present embodiment, even in the case where an additive for increasing the hardness of the nickel plating layer 12 (for example, an organosulfur compound is used) is not used in a plating bath used for forming the nickel plating layer 12, it is possible to increase the hardness of the nickel plating layer. Accordingly, the battery container to be obtained can prevent an increase in the contact resistance value after long-term storage. For this reason, the surface-treated steel sheet 1 of the present embodiment can be suitably used as battery containers for batteries to be stored or loaded for a long period, particularly stockpile batteries used in emergency such as earthquake disasters, and batteries used for remote controllers of electric apparatuses or flashlights.

EXAMPLES

The invention will be described below in detail with reference to Examples, but the invention is not limited to these Examples.

Evaluation methods of each of characteristics are as follows.

<Measurement of Surface Hardness>

The surface hardness of a nickel plating layer 12 was determined by measuring a surface-treated steel sheet 1 with a microhardness tester (manufactured by Akashi Seisakusho Co., Ltd., model: MVK-G2) using a diamond indenter under conditions of a load: 10 gf and a retention time: 10 seconds for the Vickers hardness (HV).

<Measurement of Kinetic Friction Coefficient>

With respect to the surface-treated steel sheet 1, the kinetic friction coefficient was measured under a condition of a vertical load of 1 N/mm² using a tribometer (manufactured by CSEM Instruments, contactor: SUJ-2 (chrome steel)) by obtaining readings from a record chart under a load: 100 gf and after 10 rotations.

Example 1

A steel sheet 11 obtained by annealing a cold-rolled steel sheet of low-carbon aluminum killed steel (thickness: 0.25 mm) was provided as a substrate.

Then, the steel sheet 11 provided was subjected to pickling including alkaline electrolytic degreasing and sulfuric acid immersion followed by being subjected to electrolytic plating under the following conditions to form a nickel plating layer 12 having a thickness of about 2.0 µm on the steel sheet 11. Thus, there was obtained a surface-treated steel sheet 1 including a nickel plating layer 12 formed on each of both the main surfaces of the steel sheet 11.

Bath composition: nickel sulfate 250 g/L, nickel chloride 45 g/L, and boric acid 45 g/L pH: 4.3

Bath temperature: 70° C.

Current density: 20 A/dm²

Energizing time: 35 seconds

Subsequently, the surface-treated steel sheet 1 obtained was measured for the surface hardness in accordance with the aforementioned method. The results are shown in Table 1 and FIG. 4.

Example 2

The surface-treated steel sheet 1 was produced and measured for the surface hardness in the same manner as in Example 1 except that the bath temperature during formation of the nickel plating layer 12 was set to 75° C. The results are shown in Table 1 and FIG. 4.

Comparative Examples 1 to 6

The surface-treated steel sheet 1 was produced and measured for the surface hardness in the same manner as in Example 1 except that the bath temperature during formation of the nickel plating layer 12 was set to 45° C. (Comparative Example 1), 50° C. (Comparative Example 2), 55° C. (Comparative Example 3), 57° C. (Comparative Example 4), 60° C. (Comparative Example 5), and 65° C. (Comparative Example 6). The results are shown in Table 1 and FIG. 4.

TABLE 1

|  | Bath temperature (° C.) | Surface hardness (HV) |
| --- | --- | --- |
| Example 1 | 70 | 334 |
| Example 2 | 75 | 368 |
| Comparative Example 1 | 45 | 228 |
| Comparative Example 2 | 50 | 205 |
| Comparative Example 3 | 55 | 304 |
| Comparative Example 4 | 57 | 280 |
| Comparative Example 5 | 60 | 304 |
| Comparative Example 6 | 65 | 309 |

Examples 3 to 8

The surface-treated steel sheet 1 was produced in the same manner as in Example 1 except that the thickness of the nickel plating layer 12 was set as shown in Table 2 by adjusting the current density and the energizing time of the electrolytic plating during formation of the nickel plating layer 12. Subsequently, the surface-treated steel sheet 1 obtained was measured for the surface hardness and the kinetic friction coefficient in accordance with the aforementioned method. The results are shown in Table 2 and FIGS. 5 and 6.

Comparative Examples 7 to 10

The surface-treated steel sheet 1 was produced in the same manner as in Example 1 except that the bath temperature during formation of the nickel plating layer 12 was set to 60° C. and the thickness of the nickel plating layer 12 was set as shown in Table 2 by adjusting the current density and the energizing time of the electrolytic plating. Subsequently, the surface-treated steel sheet 1 obtained was measured for the surface hardness and the kinetic friction coefficient in accordance with the aforementioned method. The results are shown in Table 2 and FIGS. 5 and 6.

TABLE 2

|  | Bath temperature | Nickel plating thickness | | Surface hardness | Kinetic friction |
| --- | --- | --- | --- | --- | --- |
|  | (° C.) | (g/m²) | (μm) | (HV) | coefficient |
| Example 3 | 70 | 5.05 | 0.6 | 259 | 0.36 |
| Example 4 |  | 10.07 | 1.1 | 283 | 0.31 |
| Example 5 |  | 15.00 | 1.7 | 317 | 0.31 |
| Example 6 |  | 19.82 | 2.2 | 351 | 0.35 |
| Example 7 |  | 24.42 | 2.7 | 371 | 0.37 |
| Example 8 |  | 28.80 | 3.2 | 384 | 0.30 |
| Comparative Example 7 | 60 | 15.09 | 1.7 | 288 | 0.41 |
| Comparative Example 8 |  | 19.71 | 2.2 | 312 | 0.38 |
| Comparative Example 9 |  | 23.79 | 2.7 | 338 | 0.38 |
| Comparative Example 10 |  | 28.54 | 3.2 | 342 | 0.32 |

Figure 4:
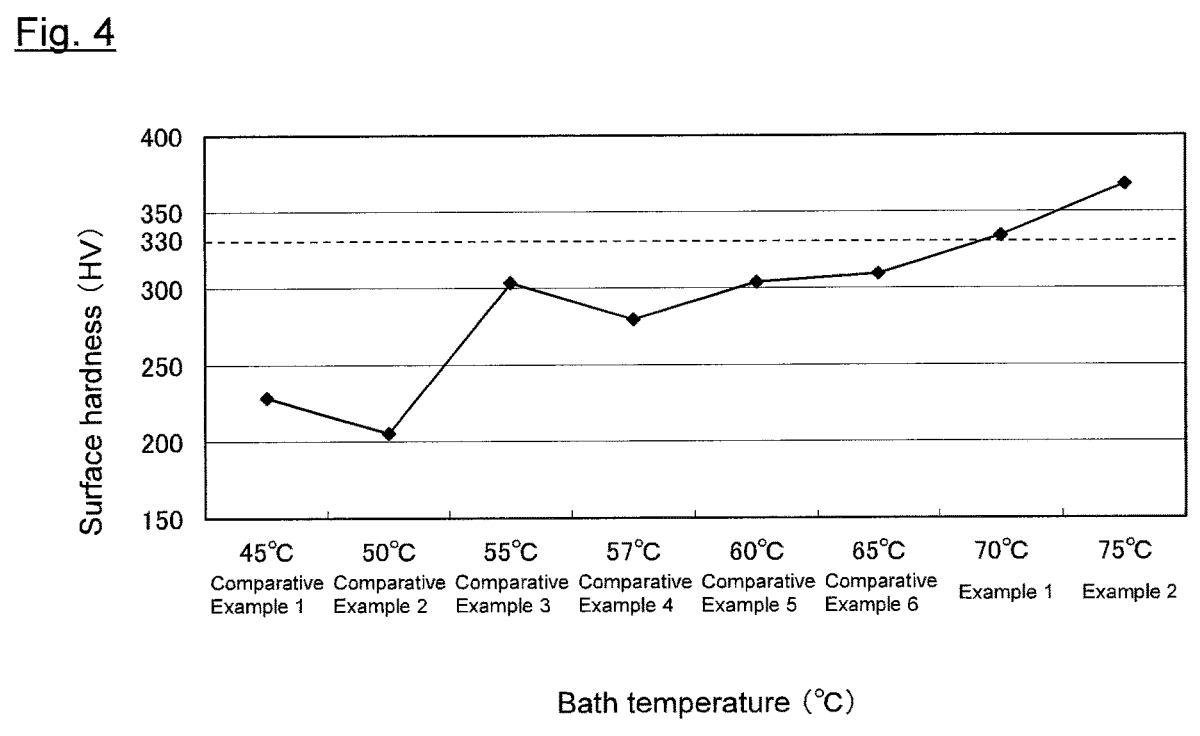

As shown in Table 1 and FIG. 4, in respect of Examples 1 and 2, in which the bath temperature during formation of the nickel plating layer 12 was set to 70° C. or more, it is conceived that the surface hardness of the nickel plating layer 12 is a high Vickers hardness (HV) of 330 or more and the kinetic friction coefficient of the nickel plating layer 12 is a low value. In contrast, as shown in Table 2 and FIGS. 5 and 6, Examples 3 to 8, in which the bath temperature during formation of the nickel plating layer 12 was set to 70° C. or more and the thickness of the nickel plating layer 12 was changed, each exhibited a relatively low measured value of the kinetic friction coefficient of the nickel plating layer 12, compared with those of Comparative Examples 7 to 10. Accordingly, in respect of the surface-treated steel sheets 1 of Examples 1 to 8, it is conceived that doubling of the surface-treated steel sheets 1 and seizure or flaws onto the press mold during press-working were effectively prevented and the press workability is excellent.

Figure 5:
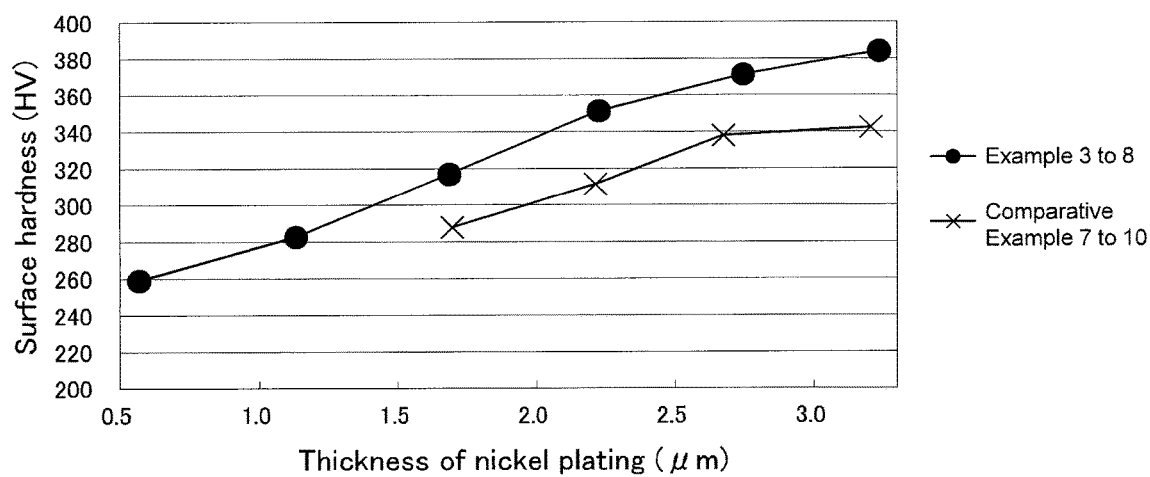
FIG. 5 is a graph showing measurement results of the surface hardness of the surface-treated steel sheets for battery containers of Examples 3 to 8 and Comparative Examples 7 to 10.
Figure 6:
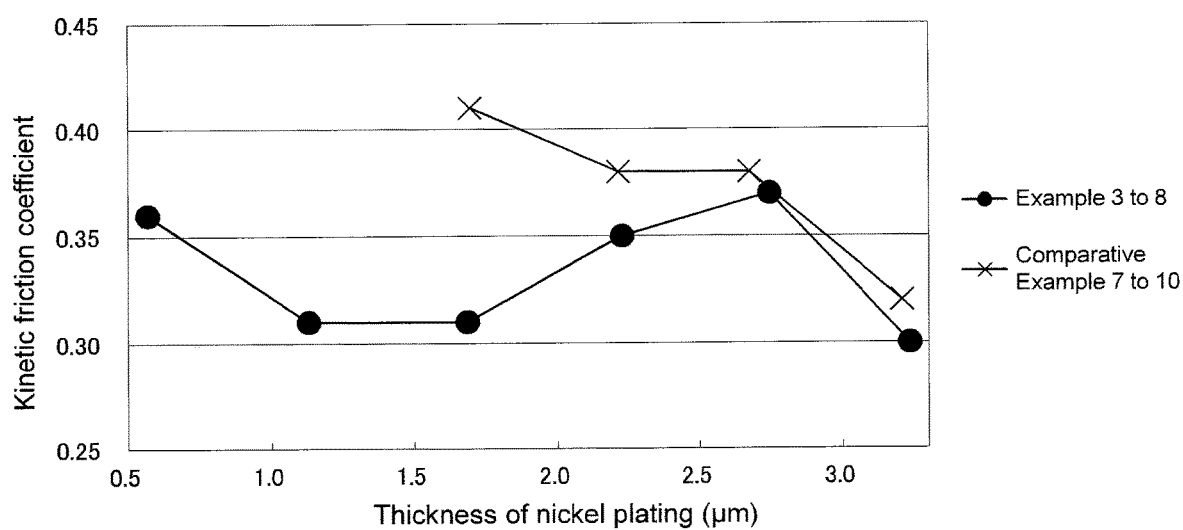
FIG. 6 is a graph showing measurement results of the kinetic friction coefficient of the surface-treated steel sheets for battery containers of Examples 3 to 8 and Comparative Examples 7 to 10.

Meanwhile, as shown in Tables 1 and 2 and FIGS. 4 to 6, Comparative Examples 1 to 10, in which the bath temperature during formation of the nickel plating layer 12 was set to less than 70° C., each exhibited a lower surface hardness of the nickel plating layer 12 and a higher kinetic friction coefficient, compared to those of the above Examples, which had a comparable thickness of the nickel plating layer 12. Thus, it is conceived that Comparative Examples 1 to 10 had inferior press workability.

Example 9

A steel sheet 11 obtained by annealing a cold-rolled steel sheet of low-carbon aluminum killed steel (thickness: 0.30 mm), having the following composition, was provided as a raw sheet.

C: 0.001% by weight, Mn: 0.160% by weight, Si: 0.010% by weight, P: 0.011% by weight, S: 0.007% by weight, Al: 0.036% by weight, N: 0.00021% by weight, and balance: Fe and inevitable impurities Then, the steel sheet 11 provided was subjected to pickling including alkaline electrolytic degreasing and sulfuric acid immersion followed by being subjected to electrolytic plating under the following conditions to form a nickel plating layer 12 having a thickness of 2.0 μm on the steel sheet 11. Thus, there was obtained a surface-treated steel sheet 1 including the nickel plating layer 12 formed on each of both the main surfaces of the steel sheet 11.

Bath composition: nickel sulfate 250 g/L, nickel chloride 45 g/L, and boric acid 45 g/L pH: 3.9 to 4.9

Bath temperature: 70° C.

Current density: 15 A/dm²

Figure 7:
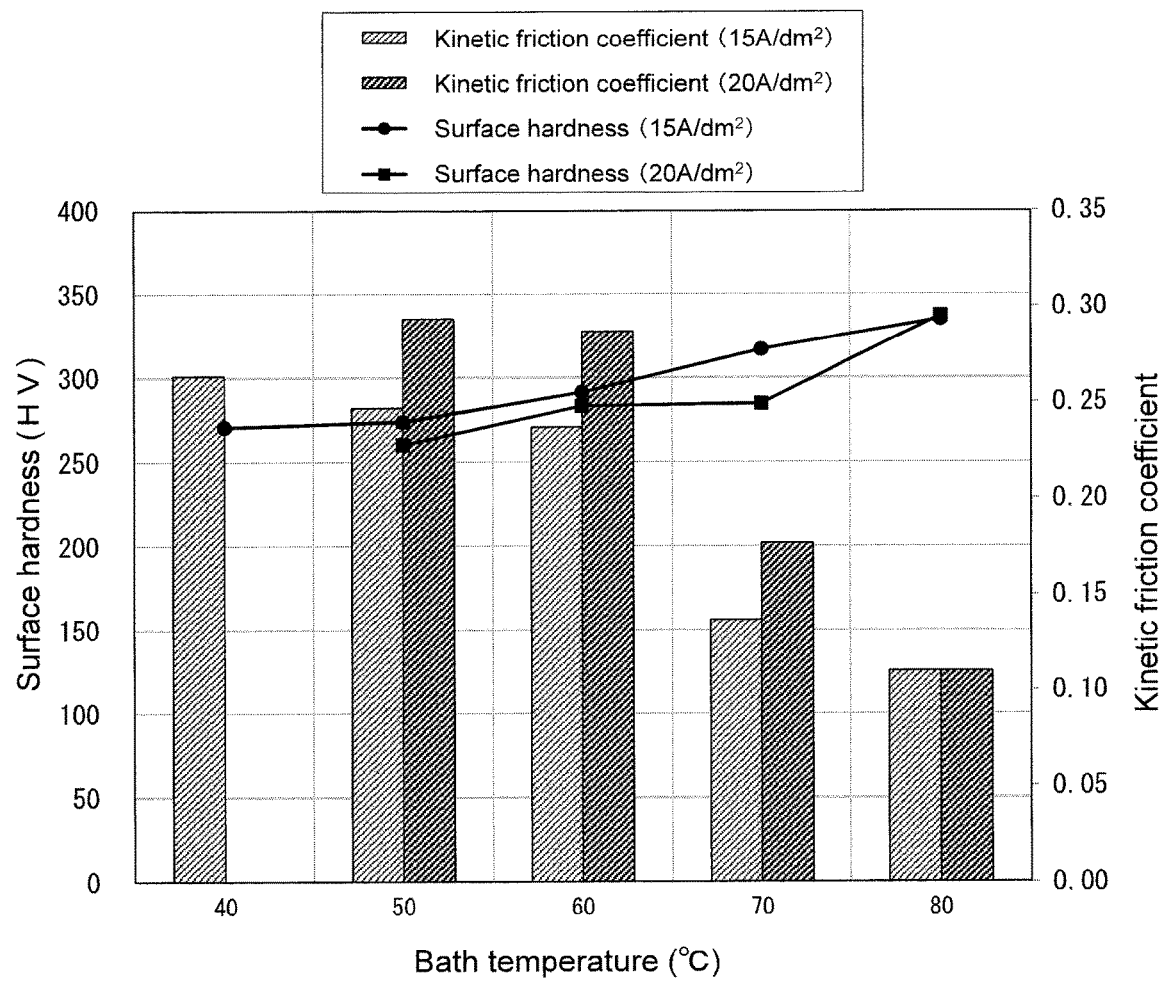
FIG. 7 is a graph showing measurement results of the surface hardness and the kinetic friction coefficient of the surface-treated steel sheets for battery containers of Examples 9 to 12 and Comparative Examples 11 to 15.

Subsequently, the surface-treated steel sheet 1 obtained was measured for the surface hardness and the kinetic friction coefficient in accordance with the aforementioned method. The results are shown in Table 3 and FIG. 7. In FIG. 7, the lateral axis was defined as the bath temperature of the plating bath, the values of the surface hardness (left vertical axis) were shown in a line graph, and the values of the kinetic friction coefficient (right vertical axis) were shown in a bar graph. With respect to the surface-treated steel sheet 1 obtained, the existence ratio of the crystal orientation (200) plane (the existence ratio of the (200) plane to the (111) plane, the (200) plane, the (220) plane, and the (311) plane) on the surface of the nickel plating layer 12 was measured by an X-ray diffraction apparatus (RINT 2500/PC, manufactured by Rigaku Corporation) to be 75.2%. Furthermore, with respect to the surface-treated steel sheet 1, the gloss level of the surface of the nickel plating layer 12 measured using a gloss meter (manufactured by NIPPON DENSHOKU INDUSTRIES CO., LTD., VG-2000) was 233.9.

Examples 10 to 12

The surface-treated steel sheet 1 was produced and evaluated in the same manner as in Example 9 except that the bath temperature and the current density of the plating bath during formation of the nickel plating layer 12 were each changed as shown in Table 3 and additionally, the thickness of the nickel plating layer 12 was controlled to 2.0 μm by adjusting the energizing time.

The results are shown in Table 3 and FIG. 7. In the surface-treated steel sheets 1 of Examples 10 to 12, the existence ratios of the crystal orientation (200) plane of the surface of the nickel plating layer 12 were 86.3% (Example 10), 58.2% (Example 11), and 59.9% (Example 12). In the surface-treated steel sheet 1 of Example 10, the gloss level of the surface of the nickel plating layer 12 was 223.2.

Comparative Examples 11 to 15

The surface-treated steel sheet 1 was produced and evaluated in the same manner as in Example 9 except that the bath temperature and the current density of the plating bath during formation of the nickel plating layer 12 were each changed as shown in Table 3 and additionally, the thickness of the nickel plating layer 12 was controlled to 2.0 μm by adjusting the energizing time. The results are shown in Table 3 and FIG. 7. In the surface-treated steel sheets 1 of Comparative Examples 11 to 15, the existence ratios of the crystal orientation (200) plane of the surface of the nickel plating layer 12 were 46.6% (Comparative Example 11), 81.2% (Comparative Example 12), 72.4% (Comparative Example 13), 88.4% (Comparative Example 14), and 85.8% (Comparative Example 15). In the surface-treated steel sheets 1 of Comparative Examples 14 and 15, the gloss levels of the surface of the nickel plating layer 12 were 219.8 (Comparative Example 14) and 225.8 (Comparative Example 15).

As shown in Table 3 and FIG. 7, the surface-treated steel sheets 1 of Examples 9 to 12, in which the bath temperature during formation of the nickel plating layer 12 was set to 70° C. or more and the current density during plating was set to 12 A/dm² or more, each had a high surface hardness value and additionally a low kinetic friction coefficient value, compared with Comparative Examples 11 to 15. Particularly as shown in FIG. 7, as the bath temperature during formation of the nickel plating layer 12 increased, the surface hardness of the surface-treated steel sheet 1 tended to be increased, and the kinetic friction coefficient of the surface-treated steel sheet 1 tended to be reduced. Accordingly, in respect of the surface-treated steel sheets 1 of Examples 9 to 12, it is conceived that doubling of the surface-treated steel sheets 1 and seizure or flaws onto the press mold during press-working are effectively prevented and the press workability is excellent.

Meanwhile, as shown in Table 3 and FIG. 7, the surface-treated steel sheets 1 of Comparative Examples 11 to 15, in which the bath temperature during formation of the nickel plating layer 12 was set to less than 70° C., each had a low surface hardness and a high kinetic friction coefficient value, compared to the Examples 9 to 12, which had a comparable thickness of the nickel plating layer 12. Thus, it is conceived that Comparative Examples 11 to 15 had inferior press workability.

Example 13

A steel sheet 11 obtained by annealing a cold-rolled steel sheet of low-carbon aluminum killed steel (thickness: 0.25 mm), having the following composition, was provided as a raw sheet.

C: 0.03% by weight, Mn: 0.18% by weight, Si: Trace % by weight, P: 0.013% by weight, S: 0.005% by weight, Al: 0.049% by weight, N: 0.00017% by weight, and balance: Fe and inevitable impurities (Formation of Underlying Layer)

Subsequently, the steel sheet 11 provided was subjected to pickling including alkaline electrolytic degreasing and sulfuric acid immersion followed by being subjected to electrolytic plating under the following conditions to form a nickel plating layer having a thickness of 0.25 μm on the steel sheet 11.

Bath composition: nickel sulfate 250 g/L, nickel chloride 45 g/L, and boric acid 45 g/L
pH: 3.9 to 4.9
Bath temperature: 60° C.
Current density: 15 A/dm²

TABLE 3

| | Underlying layer | Bath temperature (° C.) | Current density (A/dm²) | Nickel plating thickness (μm) | Surface hardness (HV) | Kinetic friction coefficient |
|---|---|---|---|---|---|---|
| Example 9 | No | 70 | 15.0 | 2.0 | 318.9 | 0.14 |
| Example 10 | | | 20.0 | 2.0 | 284.7 | 0.18 |
| Example 11 | | 80 | 15.0 | 2.0 | 335.1 | 0.11 |
| Example 12 | | | 20.0 | 2.0 | 337.1 | 0.11 |
| Comparative Example 11 | No | 40 | 15.0 | 2.0 | 270.6 | 0.26 |
| Comparative Example 12 | | 50 | 15.0 | 2.0 | 273.9 | 0.25 |
| Comparative Example 13 | | | 20.0 | 2.0 | 260.1 | 0.29 |
| Comparative Example 14 | | 60 | 15.0 | 2.0 | 291.4 | 0.24 |
| Comparative Example 15 | | | 20.0 | 2.0 | 283.2 | 0.29 |

Then, the steel sheet 11 including the nickel plating layer formed was subjected to thermal diffusion treatment by continuous annealing under conditions of a thermal treatment temperature of 720° C., thermal treatment time of one minute and a reducing atmosphere to form an iron-nickel diffusion layer as an underlying layer. The surface hardness (HV) of the iron-nickel diffusion layer was measured at this time in the same manner as the aforementioned method to be 183.0.

(Formation of Nickel Plating Layer 12)

Subsequently, the steel sheet 11 including the underlying layer (iron-nickel diffusion layer) formed was subjected to electrolytic plating under the following conditions to form a nickel plating layer 12 having a thickness of 0.5 μm on the steel sheet 11. Thus, there was obtained a surface-treated steel sheet 1 including the nickel plating layer 12 formed on each of both the main surfaces of the steel sheet 11.

Bath composition: nickel sulfate 250 g/L, nickel chloride 45 g/L, boric acid 45 g/L, and semi-brightener (LIEVERIGHT SB-71 and LIEVERIGHT SB-72) 4 ml/L pH: 3.9 to 4.9

Bath temperature: 70° C.

Current density: 15 A/dm$^2$

Figure 8:
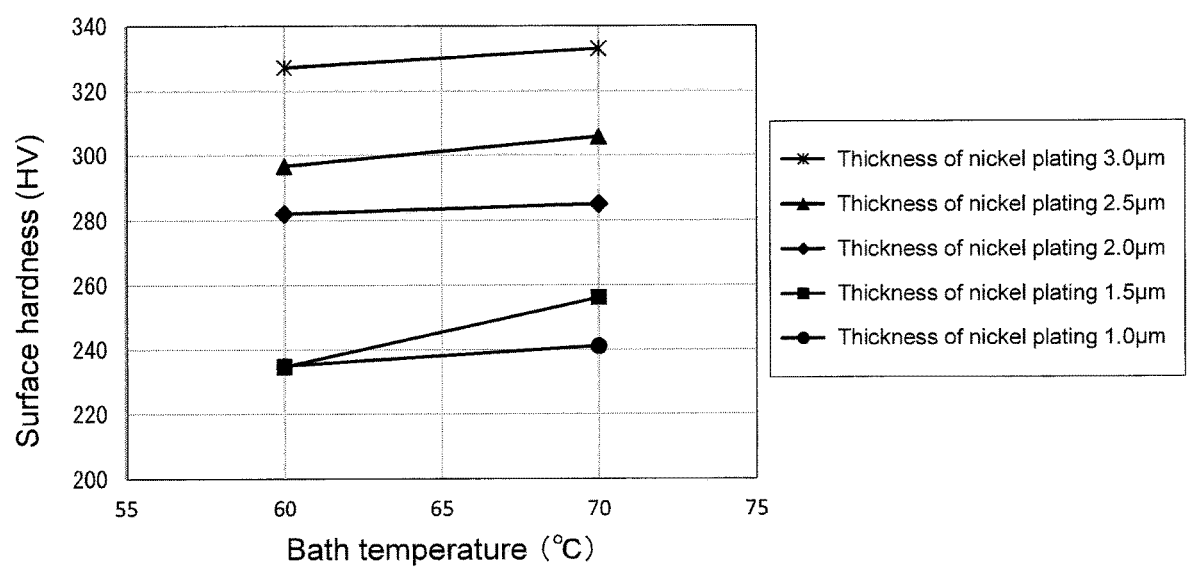
FIG. 8 is a graph showing measurement results of the surface hardness of the surface-treated steel sheets for battery containers of Examples 14 to 18 and Comparative Examples 16 to 20.

Subsequently, the surface-treated steel sheet 1 obtained was measured for the surface hardness and the kinetic friction coefficient in accordance with the aforementioned method. The results are shown in Table 4 and FIG. 8. In FIG. 8, the lateral axis was defined as the bath temperature of the plating bath, and the vertical axis was defined as the surface hardness value. In the surface-treated steel sheet 1 of Example 13, the existence ratio of the crystal orientation (200) plane of the surface of the nickel plating layer 12 was 61.88%. Furthermore, in the surface-treated steel sheet 1 of Example 13, the gloss level of the surface of the nickel plating layer 12 was 163.7.

Examples 14 to 18

The surface-treated steel sheet 1 was produced and evaluated in the same manner as in Example 13 except that the thickness of the nickel plating layer 12 was set as shown in Table 4 by adjusting the energizing time during formation of the nickel plating layer 12. The results are shown in Table 4 and FIG. 8. In the surface-treated steel sheets 1 of Examples 14 to 18, the existence ratios of the crystal orientation (200) plane of the surface of the nickel plating layer 12 were 72.53% (Example 14), 75.83% (Example 15), 82.27% (Example 16), 86.00% (Example 17), and 87.81% (Example 18). In the surface-treated steel sheet 1 of Example 16, the gloss level of the surface of the nickel plating layer 12 was 229.9.

Comparative Examples 16 to 20

The surface-treated steel sheet 1 was produced in the same manner as in Example 13 and evaluated in the same manner except that the bath temperature of the plating bath during formation of the nickel plating layer 12 was changed to 60° C. and additionally the thickness of the nickel plating layer 12 was set as shown in Table 4 by adjusting the energizing time during formation of the nickel plating layer 12. The results are shown in Table 4 and FIG. 8. In the surface-treated steel sheets 1 of Comparative Examples 16 to 20, the existence ratios of the crystal orientation (200) plane of the surface of the nickel plating layer 12 were 72.61% (Comparative Example 16), 74.76% (Comparative Example 17), 82.88% (Comparative Example 18), 85.04% (Comparative Example 19), and 88.56% (Comparative Example 20). In the surface-treated steel sheet 1 of Example 18, the gloss level of the surface of the nickel plating layer 12 was 271.8.

TABLE 4

| | Underlying layer | Bath temperature (° C.) | Current density (A/dm$^2$) | Nickel plating thickness (μm) | Surface hardness (HV) |
|---|---|---|---|---|---|
| Example 13 | Yes | 70 | 15 | 0.5 | 231.4 |
| Example 14 | | | | 1.0 | 241.1 |
| Example 15 | | | | 1.5 | 256.2 |
| Example 16 | | | | 2.0 | 285.0 |
| Example 17 | | | | 2.5 | 305.7 |
| Example 18 | | | | 3.0 | 333.0 |
| Comparative Example 16 | Yes | 60 | 15 | 1.0 | 235.0 |
| Comparative Example 17 | | | | 1.5 | 234.8 |
| Comparative Example 18 | | | | 2.0 | 282.0 |
| Comparative Example 19 | | | | 2.5 | 296.6 |
| Comparative Example 20 | | | | 3.0 | 327.2 |

As shown in Table 4, the surface-treated steel sheet 1 of Example 13, in which the bath temperature during formation of the nickel plating layer 12 was set to 70° C. or more and the current density during plating was set to 12 A/dm$^2$ or more, had a high surface hardness value although the thickness of the nickel plating layer 12 was set to as thin as 0.5 μm.

As shown in Table 4 and FIG. 8, the surface-treated steel sheets 1 of Examples 14 to 18, in which the bath temperature during formation of the nickel plating layer 12 was set to 70° C. or more and the current density during plating was set to 12 A/dm$^2$ or more, each had a higher surface hardness value, compared with Comparative Examples 11 to 15, in each of which the nickel plating layer 12 had a comparable thickness. In other words, when Example 14, in which the thickness of nickel plating layer 12 was 1.0 μm, was compared with Comparative Example 16, Example 14 had a surface hardness value higher than that of Comparative Example 16. Likewise, with respect to Example 15 and Comparative Example 17, in which the thickness of the nickel plating layer 12 was 1.5 μm, Example 16 and Comparative Example 18, in which the thickness was 2.0 μm, Example 17 and Comparative Example 19, in which the thickness was 2.5 μm, and Example 18 and Comparative Example 20 in which the thickness was 3.0 μm, Examples each had a surface hardness value higher than those of Comparative Examples.

Accordingly, it is conceived that the surface-treated steel sheets 1 of Examples 13 to 18 each had a high surface hardness value, and thus the kinetic friction coefficient would be a low value.

Meanwhile, as shown in Table 4 and FIG. 8, the surface-treated steel sheets 1 of Comparative Examples 16 to 20, in which the bath temperature during formation of the nickel plating layer 12 was set to less than 70° C., each had a lower surface hardness value, compared with Example 14 to 18, in each of which the nickel plating layer 12 had the same thickness. Thus, it is conceived that the high kinetic friction coefficient would be a high value.

DESCRIPTION OF REFERENCE NUMERALS

1 . . . Surface-treated steel sheet
11 . . . Steel sheet
12 . . . Nickel plating layer
13 . . . Nickel-cobalt alloy plating layer
2 . . . Alkaline battery 21 ... Positive electrode can
211 ... Positive electrode terminal
22 ... Negative electrode terminal
23 ... Positive electrode mixture
24 ... Negative electrode mixture
25 ... Separator
26 ... Current collector
27 ... Gasket
28 ... Insulating ring
29 ... Outer package

The invention claimed is:

1. A surface-treated steel sheet for battery containers, comprising a dull or semi-bright nickel plating layer formed on the surface to be the outside of a battery container of a steel sheet,
wherein the nickel plating layer has a thickness of 0.5 to 2.7 μm, a surface kinetic friction coefficient of 0.4 or less as measured under a load of 100 gf, and with respect to a crystal orientation of a surface of the nickel plating layer, an existence ratio of a (200) plane to a (111) plane, the (200) plane, a (220) plane and a (311) plane is 50% or more.

2. A surface-treated steel sheet for battery containers, comprising an underlying layer composed of an iron-nickel diffusion layer and a dull or semi-bright nickel plating layer formed in this order on at least the surface to be the outside of a battery container of a steel sheet,
wherein the nickel plating layer has a thickness of 0.5 to 2.7 μm, a surface kinetic friction coefficient of 0.4 or less as measured under a load of 100 gf, and with respect to a crystal orientation of a surface of the nickel plating layer, an existence ratio of a (200) plane to a (111) plane, the (200) plane, a (220) plane and a (311) plane is 50% or more.

* * * * *